Figure 1:
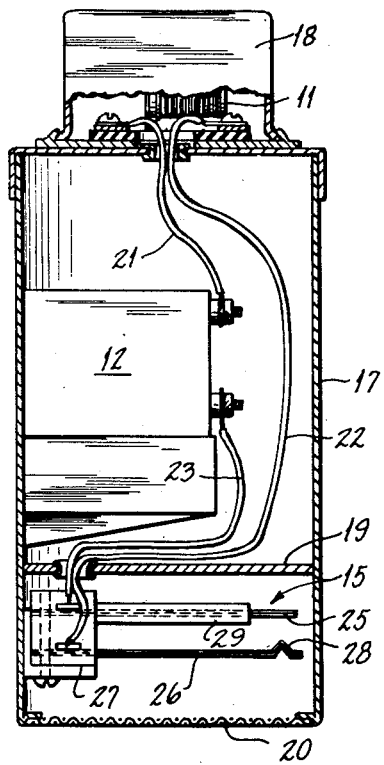

Nov. 6, 1956 R. STEINER 2,769,879
BIMETALLIC ELECTRICAL SWITCH MECHANISM, FOR
FIRE DETECTING APPARATUS
Filed Sept. 23, 1953 2 Sheets-Sheet 1

INVENTOR.
RUDOLF STEINER
BY
ATTORNEYS

Nov. 6, 1956 R. STEINER 2,769,879
BIMETALLIC ELECTRICAL SWITCH MECHANISM, FOR
FIRE DETECTING APPARATUS
Filed Sept. 23, 1953 2 Sheets-Sheet 2

INVENTOR.
RUDOLF STEINER
BY
ATTORNEYS

United States Patent Office 2,769,879
Patented Nov. 6, 1956

2,769,879

BIMETALLIC ELECTRICAL SWITCH MECHANISM, FOR FIRE DETECTING APPARATUS

Rudolf Steiner, Tullytown Township, Bucks County, Pa.

Application September 23, 1953, Serial No. 382,019

10 Claims. (Cl. 200—138)

(Granted under Title 35, U. S. Code (1952), sec. 266)

The invention described herein may be manufactured and used by or for the Government of the United States of America for Governmental purposes without the payment of any royalties thereon or therefor.

The present invention pertains to the art of thermal-responsive bimetallic units, which are suitable for contactors in thermal-responsive electrical switches, and the invention is embodied in switch mechanism which operates thermal-responsively only in response to a surge of temperature change.

A switch of the present invention comprises at least two bimetallic units or elements, which are mounted and held for thermal-responsive flexure in alternative opposite directions for on-and-off operation respectively of the switch, and severally simultaneously in opposite directions with reference to either on or off operation under a given temperature change. One of the bimetallic elements is contained in a heat-insulating envelope that inhibits its flexure in response to temperature change.

Under a surge of temperature change, the bimetallic element that is not insulated, and therefore is exposed to the ambient change in temperature, will respond. Accordingly, the exposed bimetallic element will flex in the direction to perform the desired electrical switching operation. Any flexure by the other bimetallic element in response to the ambient temperature change will be limited by its insulation and therefore slight, and will be negligible towards effecting operation of the electrical switching.

When the ambient-temperature change is slow, with a time lag that is sufficient for heat to penetrate through the insulation and produce heat exchange with the insulated bimetallic element, both bimetallic elements will flex thermal-responsively, each according to its setting for its incident thermal-responsive flexure, and the magnitude of flexure of both bimetallic elements will be approximately the same. Because the two bimetallic elements are mounted or set for flexures under a given temperature change that are opposite for switch operation, they will compensate each other. The resultant additive movement of both bimetallic elements will be zero and inoperative for switch operation.

For a gradual temperature change, for example for climatic changes such as occur commonly between winter and summer, any thermal-responsive flexure of one bimetallic element will be negatived simultaneously by corresponding flexure of the other element, and the switch will not be operated. Under a sudden ambient-temperature change, for example such as occurs when a fire breaks out, the envelope of insulation inhibits movement of the bimetallic element it contains, which will not flex. The bimetallic element that is exposed to ambient atmosphere, however, responds to the sudden temperature change, and the electrical switch operates.

The switch can be used in any of several electrical systems that are used to prevent, control or put out fires. For example, the invention is disclosed as it can be employed to sound an alarm in case of fire.

Figure 2:
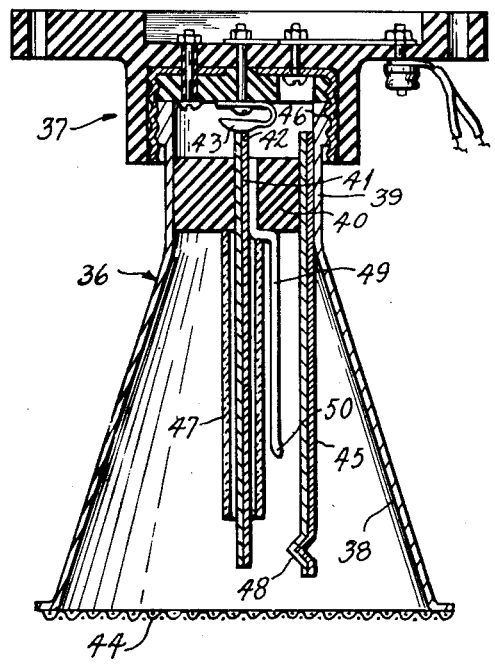
Figure 3:
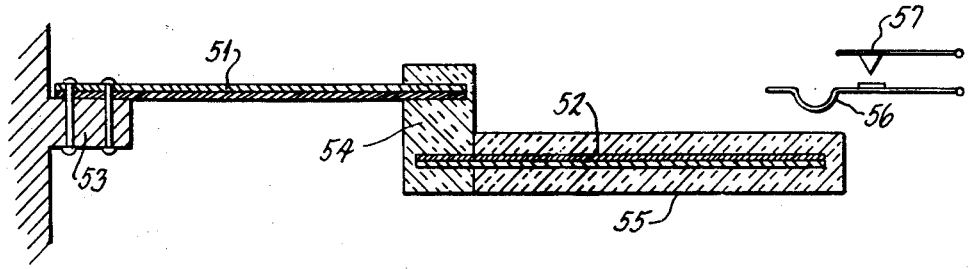
Figure 4:
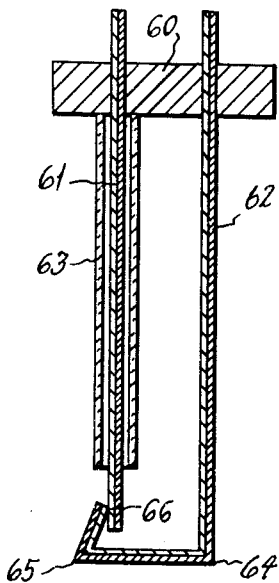
Figure 5:
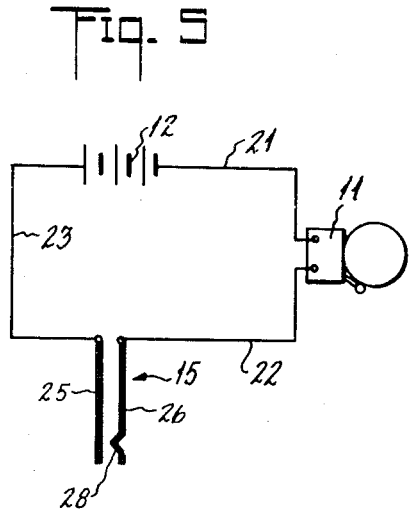
Figure 6:
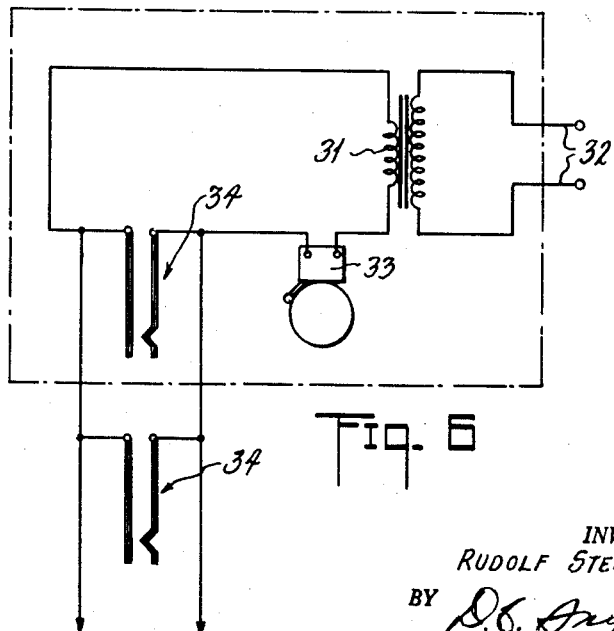

Principles of the invention, and several practical embodiments thereof, are disclosed in the accompanying drawings, in which:

Fig. 1 is a side elevation, partly in section on a longitudinal centerplane, which illustrates an alarm signaling apparatus embodying the invention, Fig. 2 is a cross-sectional elevation on a longitudinal centerplane, illustrating a modified form of switch component embodying the invention, Fig. 3 is a cross-sectional elevation of another embodiment of switch elements, Fig. 4 is a cross-sectional elevation of another embodiment of switch elements, Fig. 5 is a wiring diagram of the electrical system in the embodiment of Fig. 1, and Fig. 6 is a wiring diagram of a modified form of electrical system embodying the invention.

The apparatus of Fig. 1 is a fire-alarm device or unit which is adapted to be installed anywhere that there is danger from fire. For example, the apparatus of Fig. 1 can be used in the home, or in an automobile, or anywhere else where a fire hazard exists.

The apparatus of Fig. 1 comprises an audible electrical alarm mechanism such as buzzer 11, energized by battery 12 through thermal-responsive switch 15. The battery 12 is enclosed in housing 17, and is secured therein, and preferably may be any suitable dry-cell, so called. Buzzer 11, which is a conventional unit having appropriate electrical characteristics corresponding with battery 12, is secured at one end of housing 17, and is enclosed in its own housing 18.

Switch 15 is secured inside housing 17, in a chamber which preferably is separated by baffle wall 19 from the chamber that contains battery 12. Screen 20 encloses switch 15 in container 17 and is open-mesh for free circulation of ambient atmosphere, switch 15 being exposed thereby to the ambient atmosphere surrounding the device in position to respond to any temperature change of the atmosphere. Baffle wall 19 serves to protect battery 12 against deterioration from any excessive surge of temperature change of the ambient atmosphere.

The electrical circuit of the apparatus of Fig. 1 is as seen in Fig. 5, and comprises an electrical lead 21 from battery 12 to buzzer 11, with a return lead 22 to switch 15, the other side of the battery being connected to switch 15 through lead 23.

Switch 15 comprises an electrical contact mechanism which consists of two bimetallic elements 25 and 26, these being held in place by the mount 27 consisting of a base, which is secured to the inside of housing 17, and which holds the bimetallic elements 25 and 26 each at its one end and projecting away from the mount into side-by-side or adjacent position as shown. Each element 25 and 26 is made of two pieces of metal having different coefficients of thermal expansion, and bends or flexes in a manner that is well-known by its being subjected to temperature change. The same two metals are used in the elements 25 and 26, with respective like coefficients of expansion, and the elements 25 and 26 are cut approximately to the same length. Thus, the elements 25 and 26 bend by approximately the same amount when they are subjected to the same conditions of temperature change.

Element 26 is formed to comprise the contact point 28, which engages element 25 at a companion point whenever one or the other or both elements are flexed, and resultant movement relative to each other positions them in physical contacting engagement. This closes the electrical circuit of switch 15 that sounds the audible alarm 11, and occurs in response to any flexure differential between thermal-responsive flexing of the several bimetallic elements 25 and 26 in the direction of electrical contact 28 and its companion point of element 25 engaging each other.

Mount 27 holds the several elements 25 and 26 respectively oriented to move oppositely under a given temperature change with reference to their respective movements toward on-and-off operation of switch 15. Element 26 flexes towards contact with element 25 under a rising temperature change, and in the direction away from element 25 in response to a falling temperature. When element 25 responds to the same temperature rise, it flexes in the direction away from and out of contact with element 26, and element 25 flexes in the direction towards element 26, which moves away, during a falling temperature. However, the physical direction of flexing of elements 25 and 26 under a given temperature change is the same in the embodiment of Fig. 1. When the temperature change is such that bimetallic element 26 is flexed upwardly in Fig. 1 towards electrical contacting engagement of its point 28 with its companion contact point of bimetallic element 25, the same temperature change is operable to flex element 25 in the same upward physical direction, which is the direction for flexing element 25 out of electrical contacting engagement with point 28, and therefore is oppositely for on-and-off operation of switch 15.

Heat insulating envelope or jacket 29 contains one or the other of the bimetallic elements 25 and 26, and in the disclosed embodiment it contains element 25. Insulation 29 comprises a length of braided sleeve, comprising fiberglass or the like heat-insulating material, which is slipped over element 25 in the position shown. Envelope 29 contains a predetermined portion of the length of bimetallic element 25 that extends away from base 27.

During any temperature change of the atmosphere around the device of Fig. 1 to which switch 15 is exposed through open-mesh screen 20, insulating sleeve 29 inhibits heat transfer to or from the element 25, and operates to delay its thermal-responsive flexure. If temperature rise is sudden, for example when the device is in an atmosphere where a fire takes place, the heat transfer to bimetallic element 25 is retarded sufficiently to prevent its appreciable flexure, whereas element 26 is flexed in the direction to actuate contact point 28 into engagement with element 25, and the electric circuit of switch 15 is closed thereby that operates the audible alarm 11.

When atmospheric temperature change is slow, for example during climatic changes between winter and summer, the time lag is sufficient for heat transfer to element 25 through insulation 29 virtually at the same rate as to exposed element 26, and element 25 is flexed by an amount that corresponds with the amount of flexure of element 26 under the same condition of atmospheric temperature change. Thus, during a rising temperature change, element 25 moves away from contact point 28 at the same rate that contact point 28 moves towards element 25, and during a falling temperature change, element 25 moves towards contact point 28 while at the same rate of movement the contact point 28 moves in the direction away from element 25.

Therefore, the device of Fig. 1 does not operate over the wide range of temperature changes that occur under the usual atmospheric conditions. But a much lower magnitude of temperature change that is sudden, such as the surge of heat that occurs when a fire breaks out, is sufficient to actuate point 28 into contacting engagement with bimetallic element 25, and cause the alarm 11 to be sounded. It will be observed that the device of the invention adjusts itself automatically to whatever atmospheric temperature prevails. As a fire-detecting device, sensitivity of the instrument is greatly enhanced.

When it is desired to protect an extended space, or several spaces that are separated from each other, for example to protect a factory or store against fire, the electrical circuit of Fig. 6 may be more desirable. Transformer 31 is connected across the line 32, which may be any available electrical power line or source in the factory or store, and transformer 31 supplies a stepped-down voltage that is suitable for auible alarm 33. Alarm 33 is located anywhere it is desired to hear the alarm, and obviously any number of alarms 33 can be included in the circuit and severally located where they are desired. The circuit includes a plurality of detector switches 34, which are connected in parallel, and which can be located severally wherever there is danger from fire. Thus, the alarm 33 will be sounded by a fire that breaks out in any of several remote locations in the establishment.

Fig. 2 shows detailed structure of a detector switch, such as would be suitable for switch 34 in the electrical system of Fig. 6.

The detector switch of Fig. 2 comprises a housing 36 which is threaded at its one end, the threads being standard to fit a standard electrical outlet 37 of which there may be several distributed along the circuit of Fig. 6 at suitable locations throughout the spaces to be protected from fire.

The housing of the detector switch of Fig. 2 includes an atmospheric chamber 38 at its end opposite the threaded end, chamber 38 being flared at its outer end as shown, and tapering down to the cylindrical body 39. Dielectric block 40 is secured inside the body 39, and holds the bimetallic element 41 in position for its one end 42 to project within the cavity of outlet 37, where it presses against and makes electrical contact with a suitable terminal 43 of outlet 37 which may be a terminal in the circuit of Fig. 6.

Bimetallic element 41 projects from the opposite side of block 40 into the atmospheric chamber 38, where it is positioned in the ambient atmosphere that enters housing 36 through screen 44. Chamber 38 is flared as shown to extend the area of screen 44, to permit a more free access of ambient atmosphere to the interior of the chamber.

A second bimetallic element 45 is secured to block 40 between the block and the wall of housing body 39, and in electrical contact therewith. Housing 36 is adapted to make electrical contact through its threaded end with a suitable terminal 46 of outlet 37, and terminal 46 may be in parallel with terminal 43 of outlet 37 in the circuit of Fig. 6. The structure of terminals 43 and 46 of outlet 37 will be recognized as somewhat the same as is found in the standard and conventional light socket that presently is in general use.

The detector switch of Fig. 2 is similar to switch 15 of Fig. 1 as hereinbefore described, with bimetallic elements 41 and 45 corresponding with respective bimetallic elements 25 and 26.

Bimetallic element 41 is contained in heat-insulating sleeve 47, which is the same as heat insulator 29. Bimetallic element 45 is held by block 40 to project into atmospheric chamber 38 alongside bimetallic element 41 in the same manner as elements 25 and 26 in Fig. 1, and comprises contact point 48, which is like contact point 28, which moves into contacting engagement with bimetallic element 41 by a sudden temperature rise causing element 45 to flex.

Both elements 41 and 45 are flexed in the same physical direction by a given temperature change, but oppositely with reference to their respective movements for on-and-off operation of the switch, and in this particular are like switch 15. Thus, during a rising temperature change, point 48 moves towards contacting engagement with bimetallic element 41, which also moves in the same direction and away from point 48 if the rise is slow. During a climatic change of atmospheric temperature, element 41 and contact point 48 move at the same rate in the same direction simultaneously, and keep out of contacting engagement. During a sudden temperature rise, such as a surge of heat from a fire, insulation 47 inhibits heat transfer to element 41, which does not flex and is overtaken, and point 48 moves into contacting engagement therewith.

It will be observed that metallic housing 36 is a good conductor of heat, and it transmits heat to bimetallic element 45 but not to bimetallic element 41. Metallic housing 36 increases the heat-responsive sensitivity of the instrument.

The detector switch of Fig. 2 embodies the rigid contact 49, which is held at its one end in dielectric block 40 in electrical contacting engagement with bimetallic element 41. Rigid contact 49 extends from block 40 into chamber 38 where its terminus 50 is located adjacent to bimetallic element 45. Terminus 50 is a contact point, which is positioned to be engaged electrically by element 45 when it is flexed by temperature rise to a predetermined extent which is the maximum permissible temperature. When the temperature of the ambient atmosphere reaches a predetermined magnitude that is the maximum desired, element 45 is flexed into contacting engagement with point 50, and closes the circuit of Fig. 6 to sound alarm 33, even though the position of bimetallic element 41 is away from contacting engagement with point 48.

In each of the embodiments of Figs. 1 and 2, both bimetallic elements 25 and 26, and 41 and 45, constitute electrical contacting members. This structure is not essential.

In the embodiment of Fig. 3, bimetallic elements 51 and 52 operate as actuating members for mechanical movement. Element 51 is secured at its one end to the fixed mount 53, and at its opposite end is secured to auxiliary mount 54, to which the element 52 is secured at one of its ends. Element 51 is held by mount 53 oriented to flex upwardly, in Fig. 3, under temperature increase, and element 52 is held by mount 54 oriented to flex downwardly. Element 52 is contained in heat insulation 55.

The end of element 52 remote from mount 54 is positioned adjacent to the rotor 56, which it actuates upwardly in Fig. 3 when element 52 moves upwardly, and rotor 54 thereby moves into electrical contacting engagement with stator 57 of the electrical switch 56, 57.

During a slowly changing temperature, element 51 flexes in one direction, and element 52 flexes in the physically opposite direction, nullifying movement at its free end, which thereby is not displaced appreciably with reference to rotor 56. But during a suddenly rising temperature, such as the surge of heat that occurs when a fire breaks out, insulator 55 inhibits flexing of bimetallic element 52, and bimetallic element 51 flexes upwardly in Fig. 3, thereby moving element 52 into engagement with rotor 56 to press the rotor into electrical contacting engagement with stator 57 and closing circuit thereby.

Sometimes an electrical system is desired in which the circuit is normally closed, but in which the circuit is opened by a surge of heat. The switch of Fig. 4 is suitable for the purpose, and comprises the dielectric block 60, which holds the bimetallic elements 61 and 62 extending alongside each other, both elements being oriented in block 60 to flex in the same physical direction under a given temperature change, and to flex to the left in the figure under temperature increase.

Element 61 is contained in heat-insulator sleeve 63, and thus is like the element 41 of Fig. 2. At its free end, element 62 is formed with a lateral bend at 64 that extends it beyond element 61, and is formed with reentrant bend 65 to extend it to a terminus 66 that constitutes a contact point which bears against element 61 on the side thereof opposite element 62 in electrical engagement therewith.

During a given temperature change that progresses slowly, bimetallic elements 61 and 62 are flexed in the same physical direction by approximately the same amount, and point 66 remains in electrical contact with element 61. During a suddenly rising temperature, insulator 63 inhibits heat exchange to element 61, which thereby is not flexed appreciably. Element 62, however, is flexed to the left in Fig. 4, and point 66 is moved out of contacting engagement with element 61, thereby opening the circuit.

The disclosure herein presents several practical embodiments of the invention, the scope of which is determined by the accompanying claims.

I claim:

1. In a thermal-responsive device for a fire-protection system, at least two bimetallic elements flexible thermal-responsively for a given operation involving two way movement, a mount for the elements holding them for thermal-responsive flexing each alternatively in opposite directions for respective opposite movements of operation, the mount holding the several elements oriented to flex respectively oppositely for operation movements under a given temperature change, an envelope containing one only of the two bimetallic elements and comprising heat-insulating material resisting thermal response in the element to atmospheric temperature changes, the second of the two bimetallic elements being open to the atmosphere.

2. In a thermal-responsive device as defined in claim 1, the mount comprising a rigid base to which one bimetallic element is secured at its one end, an auxiliary base secured to the first bimetallic element at its opposite end and to the other bimetallic element at an end to hold both bimetallic elements extended end-to-end, the auxiliary block holding the bimetallic elements oriented for heat-responsive flexure in opposite physical directions under a given temperature change.

3. In a thermal-responsive electrical switch for a fire-protection system, electrical-contacting mechanism comprising at least two bimetallic elements flexible thermal-responsively to operate the electrical-contact mechanism for on-and-off operation of the switch, a mount for the elements holding them for thermal-responsive flexing each in alternative opposite directions towards and away from contacting for respective on-and-off operation of the switch, the mount holding the several elements respectively oriented to flex oppositely for on-and-off operation of the switch under a given temperature change, an envelope containing one only of the two bimetalic elements and comprising heat-insulating material resisting thermal response in the element to atmospheric temperature change, the second of the two bimetallic elements being open to the atmosphere.

4. In a switch as defined in claim 3, the several bimetallic elements constituting the several electrical-contact members of the electrical-contacting mechanism, the mount holding the several elements extended to positions side-by-side.

5. In a switch as defined in claim 4, the mount holding the several elements oriented to flex in the same physical direction under a given temperature change.

6. In a switch as defined in claim 5, the several elements comprising companion contact points positioned for movement out of contact with each other by the elements flexing relatively towards each other.

7. In a switch as defined in claim 4, a rigid contact member comprising a contact point, the mount holding the rigid contact member in short-circuiting engagement with the heat-insulated element, and with its contact point in position with reference to the other bimetallic element for electrical contacting engagement thereby at a predetermined maximum magnitude of its flexure.

8. In a switch as defined in claim 3, an exterior housing containing the bimetallic elements, the mount holding the heat-insulated element out of heat-transferring engagement with the housing, the mount holding the other bimetallic element in heat-transferring engagement with the housing.

9. In a thermal-responsive device, an electric circuit embodying a source of electrical energy, an annunciator, and a thermal-responsive electrical switch, the switch embodying electrical-contact mechanism comprising at least two bimetallic elements flexible thermal-responsively and constituting the several electrical-contact members of the electrical-contact mechanism, a mount for the bimetallic elements holding them for thermal-responsive flexing, each in alternative opposite directions towards and away from contacting each other for respective on-and-off operation of the switch, the mount holding the several elements extended to positions side-by-side, and holding the several elements respectively oriented to flex oppositely for on-and-off operation of the switch under a given temperature change, a heat-insulating envelope containing one only of the bimetallic elements, and a housing containing the energy source, annunciator and switch as a unit.

10. In a thermal-responsive device for a fire-protection system, at least two bimetalic elements flexible thermal-responsively and positioned adjacent to each other, a mount comprising a rigid base secured at one end of the several adjacently-positioned bimetallic elements and holding them extending away from the base to flex thermal-responsively each towards and away from the other, the several bimetallic elements comprising companion electrical contacts at their ends remote from the base and relatively positioned for contacting engagement in response to flexure differential between the thermal-responsive flexing of the several elements, and a heat-insulating envelope containing one bimetallic element only for a predetermined portion of its length extending away from the base to inhibit its flexure thermal-responsively.

References Cited in the file of this patent

UNITED STATES PATENTS

| | | |
|---|---|---|
| 2,247,539 | Winfield | July 1, 1941 |
| 2,444,745 | Mosley | July 6, 1948 |
| 2,514,807 | Shaw | July 11, 1950 |
| 2,698,368 | Lehr et al. | Dec. 28, 1954 |